Figure 1:
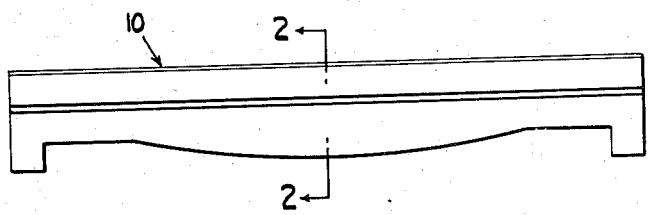

March 31, 1959     R. E. JONES     2,880,098
REFRACTORY ARTICLES AND COMPOSITIONS THEREFOR
Filed April 23, 1956

INVENTOR.
RICHARD E. JONES

BY Oscar Spencer
ATTORNEY

2,880,098

REFRACTORY ARTICLES AND COMPOSITIONS THEREFOR

Richard E. Jones, Brackenridge, Pa., assignor to Pittsburgh Plate Glass Company, Allegheny County, Pa., a corporation of Pennsylvania Application April 23, 1956, Serial No. 579,845

14 Claims. (Cl. 106—68)

This invention relates to refractory articles such as those used in the roof of the forehearth of the apparatus for drawing sheet glass and also relates to compositions for the manufacture of refractory articles.

In the manufacture of window glass by drawing operations a shutoff or cutoff bar or block is mounted to the forehearth of the drawing apparatus. Part of the roof has two L blocks, i.e., elongated blocks that are substantially L-shaped in vertical section. The L blocks are mounted so that the horizontal leg of each extends toward the drawn sheet of glass. Such drawing apparatus including L blocks are shown in U.S. Patent No. 2,303,805 of L. B. White et al., granted on December 1, 1942; U.S. Patent No. 2,104,460 of H. L. Halbach, granted on January 4, 1938; and U.S. Patent No. 2,519,457 of H. L. Halbach et al., granted on August 22, 1950. In the conventional drawing apparatus a draw bar is immersed in the molten glass as shown in the foregoing patents.

To start the operation of a glass drawing apparatus heretofore, the drawing kiln or forehearth is brought up to temperature with the molten glass provided from the associated glass tank furnace but the cutoff block, the L blocks and the draw bar are not in their appropriate positions in the drawing kiln. Because of the refractory compositions of the draw bar, cutoff block, and L blocks, it has been necessary to prepare them from dried molded articles in a firing kiln near the drawing apparatus. The articles are then maintained in the kiln at the operating temperature of the glass drawing kiln. These articles are then removed from the firing kiln and without substantial cooling are set in position in the drawing kiln when the latter has reached its operating temperature. Molten glass is in the drawing kiln. It has been formed in the glass tank furnace associated with the drawing kiln and flows into the latter. This operation is necessary to avoid severe cracking due to thermal shock that would occur if these articles were in position when bringing the drawing apparatus to the operating temperature. The refractory composition of the L blocks is different from the composition used for the cutoff block and the draw bar. When bringing the drawing apparatus up to temperature the part of top of the forehearth that during operation is occupied by the L blocks and the span therebetween is covered by refractory cover plates. The foregoing sequence of operations for the start up of a drawing apparatus requires considerable time for setting of the hot L blocks, draw bar and cutoff block before the drawing operation can be initiated. The thermal shock of refractory compositions of the L blocks heretofore used resulted in cracking or spalling to an undesirable extent even when moved from a hot firing kiln to the drawing kiln and set in place as soon as possible.

The refractory compositions heretofore used for the manufacture of L blocks for a drawing apparatus comprised a mixture of 38% by weight of a plastic fire clay (9 mesh to fines), 22% by weight of a burnt fire clay (4 mesh to fines), 20% by weight of a ground (4 mesh to fines) burnt refractory material made from sand and burnt clay bonded by plastic fire clay, 4% by weight of banding sand (48 mesh to fines) and 16% by weight of agate sand (100 mesh to fines). This composition was used to make the L blocks by the conventional stiff mud process. In that process the stiff mud is rammed in the mold of the requisite shape. The mold is removed from the molded article. The latter is allowed to dry in the usual manner and then placed in a firing kiln where it is very gradually and uniformly brought up to the firing temperature and then kept at the temperature of the drawing forehearth or kiln until it is to be placed in position as part of the roof of the drawing kiln.

It is an object of the present invention to provide refractory compositions that can be used to make refractory articles that have improved resistance to cracking and spalling when subjected to thermal shock.

It is another object of the invention to provide refractory compositions for the manufacture of L blocks for sheet glass drawing apparatus that can be placed at room temperature in position in the drawing apparatus prior to bringing the drawing apparatus up to the operating temperature.

It is a further object of the present invention to provide L blocks for sheet glass drawing apparatus that can be stored at room temperature rather than in a firing kiln and then positioned in the drawing kiln before the heating of a window glass forehearth at the start up of the drawing apparatus.

Figure 2:
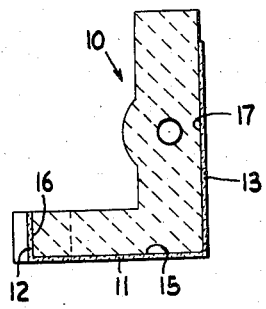

These and other objects of this invention will be apparent to one skilled in the art from the following description taken in conjunction with the drawing in which:

Fig. 1 is a top plan view of a preferred L block for a window or sheet glass drawing apparatus and made from the refractory composition of the present invention; and Fig. 2 is a vertical section along the line 2—2 of Fig. 1 and shows a refractory coating of a different composition on those sides of the L block exposed to fumes in a drawing kiln.

I have found that refractory articles, such as L blocks and cover plates for a window glass drawing apparatus, having an improved resistance to cracking or spalling when subjected to thermal shock can be prepared by using a composition comprising about 15 to 45% of a plastic clay, about 10 to 65% of a burnt clay and about 20 to 70% of fused silica. These percentages are by weight of the total dry solids of the composition. When this composition is used for forming refractory articles by the conventional stiff mud process, the composition comprises about 28 to 45% by weight of a plastic clay, about 10 to 52% by weight of a burnt clay and about 20 to 70% by weight of fused silica. When the composition is used for the formation of refractory articles by the conventional slip casting method the composition comprises about 15 to 45% by weight of a plastic clay, about 10 to 65% by weight of burnt clay and about 20 to 70% by weight of fused silica.

In the foregoing compositions of the invention it is preferred that the ratio of the burnt or calcined clay to fused silica be less than 2. Examples of the burnt or calcined clay are calcined flint, which is a burnt flint clay, burnt kaolin, burnt fire clay, and burnt ball clay. The plastic clay of the compositions of the present inventions can be any one of the clays that are well known to have sufficient plasticity to serve as bonding agents for the preparation of refractories. In the use of these compositions for the formation of refractory articles, the compositions are used with water for the stiff mud or slip casting techniques. For both processes the amount of water used is between about 10 and 21% by weight based on the weight of total solids. The amount of water within this range is dependent upon the technique used as well as the characteristics and amount of the plastic clay that serves as the bonding agent. Furthermore, mixtures of plastic clays can be used to provide the stated percentage of plastic clay and similarly mixtures of burnt clays can be used to provide the recited percentage. The plastic clay for the composition used in slip casting process is a clay, such as kaolin and ball clay, that is deflocculated by an electrolyte added to the composition with the water. Conventional electrolytes in an amount of about 0.1 to 0.25% by weight (based on weight of the total solids) is used. An example of an electrolyte is a mixture of about 80% by weight of sodium silicate and about 20% by weight sodium hydroxide.

In the foregoing compositions of the present invention the plastic clay has a maximum particle size so that substantially all of it will pass through a 4-mesh screen. Preferably all of the plastic clay in the mixture of solids will pass through a 9-mesh screen. The calcined or burnt clay and the fused silica likewise should have also a small particle size.

The L block generally indicated at 10 having the refractory composition of the present invention has coatings 11, 12 and 13 on surfaces 15, 16 and 17, respectively. These coatings are made of a different refractory composition as described. It is noted that coating 13 in the illustrative example covers only a lower part of surface 17 because the upper part of the surface 17 is not exposed to the fumes in a drawing kiln. The coatings 77, 12 and 13 are relatively thin, e.g., about ¾ inch.

The following is an illustrative example of the preparation of the L block of Figs. 1 and 2 from one of the preferred compositions of the present invention using the stiff mud process. There is prepared a mixture of 33⅓ by weight of fire clay (9 mesh to fines), 33⅓ by weight of calcined flint, (4 mesh to fines) and 33⅓ by weight of fused silica (9 mesh to fines). The plastic clay is Monroe County Fire Clay, which is a fire clay obtained commercially from Monroe County, Missouri. The calcined flint is known as Calcined Flint Pennsylvania. Fused silica as commercially available is in lump form and is placed in a crusher-grader to obtain material that has a particle size specified above. This mixture is then mixed with 13% by weight, based on the weight of the total solids, of water.

The stiff mud, that is obtained, is rammed into a mold to obtain the L block and the top surface of the rammed mixture is smoothed. The mold is disassembled to remove the resultant shaped article. The latter is allowed to dry slightly after which all of the surfaces of the shaped body are smoothed. The shaped body is then kept covered with burlaps, that have been wet, for about 90 days until it has dried. The dried article is placed in a firing kiln that is at room temperature. The kiln is brought slowly and uniformly up to a temperature of about 2150° F. and the firing schedule to do this takes about 15 to 20 days. The fired or burnt article is now ready to be placed in position in the drawing apparatus. This can be done while the L block is still hot. Alternately, the L block can be retained in the kiln and the latter gradually cooled over a period of 7 to 10 days to room temperature. The L block at room temperature can be placed in position in the forehearth of the drawing apparatus when rebuilding the drawing kiln or forehearth.

As seen in Fig. 2 the preferred L block having the refractory composition as specified above has several of its surfaces coated with a different refractory composition that is resistant to attack by the fumes above the glass in the drawing kiln. In the absence of such a refractory coating some of the surfaces of the L block of the composition of the present invention, like the composition heretofore used, woud be attacked by the fumes to form products that would drip from the L block into the molten glass, thereby contaminating the latter. The material of the refractory coating is preferably a composition comprising plastic clay, calcined kyanite, a burnt clay, such as calcined flint, and a ground burnt refractory material containing sand and burnt clay bonded by plastic fire clay. The calcined kyanite provides the corrosion resistance to the refractory composition and is used in substantial amounts such as about 50% by weight of the mixture and is preferably 6 mesh to fines. The plastic clay is preferably Monroe County Fire Clay (8 mesh to fines) and when using this plastic clay it is necessary to use the stiff mud process for forming the coating. The calcined flint is used in an amount of 10% by weight. The fourth ingredient, the burnt ground refractory material is used, in the preferred composition for the coating, in an amount of 5% by weight and is 3 mesh to fines. The foregoing composition in the stiff mud process has been used successfully with about 17% by weight of water. The amount of water is based on the weight of the total solids. The advantage of using this type of refractory composition containing calcined kyanite in conjunction with the compositions of the invention for the stiff mud process is that the appropriate surfaces of the mold can be first provided with a relatively thin coating of this calcined-kyanite-containing refractory composition by the stiff mud method before ramming into the mold the stiff mud composition of the invention.

The following is the sieve analysis of the refractory composition used with water in the stiff mud process of the foregoing illustrative example for the preparation of refractory articles, such as L blocks, by the stiff mud process.

| | Percent |
|---|---|
| On 4 mesh | 0.3 |
| On 6 mesh | 5.1 |
| On 8 mesh | 5.6 |
| On 10 mesh | 6.1 |
| On 14 mesh | 6.0 |
| On 28 mesh | 16.0 |
| On 48 mesh | 10.2 |
| On 100 mesh | 7.5 |
| On 200 mesh | 4.7 |
| Through 200 mesh | 37.9 |

Sieve analyses of suitable fire clay, calcined flint and fused silica for use in the illustrative example are as follows:

| | Fire Clay | Calcined Flint | Fused Silica |
|---|---|---|---|
| | Percent | Percent | Percent |
| On 4 mesh | | 8.3 | |
| On 6 mesh | | 19.9 | |
| On 8 mesh | | 16.0 | |
| On 10 mesh | | 13.0 | |
| On 14 mesh | 0.25 | 10.0 | 1.3 |
| On 28 mesh | 0.36 | 16.5 | 30.3 |
| On 48 mesh | 0.28 | 8.0 | 22.5 |
| On 100 mesh | 0.23 | 4.3 | 18.2 |
| On 200 mesh | 0.41 | 2.5 | 10.1 |
| Through 200 mesh | 98.47 | 1.5 | 17.6 |

The chemical analysis of the foregoing mixture of one third of each before addition of water is typically as follows:

| | Percent |
|---|---|
| $SiO_2$ | 68.25 |
| $Al_2O_3$ | 25.35 |
| $Fe_2O_3$ | 0.36 |
| $TiO_2$ | 1.50 |
| CaO | 0.23 |
| MgO | 0.22 |
| Alkali oxide | 0.64 |
| Loss on ignition | 3.29 |

The following are the properties of the refractory article of the illustrative example:

Modulus of rupture, before firing, p.s.i.,
  at room temperature _____ 163
PCE:
  Cone _____ 29+
  °F. _____ 2984+
Porosity, percent:
  Cone 08 _____ 24.6
  Cone 4 _____ 23.7
Burning shrinkage, percent:
  Cone 08 _____ 0.1
  Cone 4 _____ 0.7
Modulus of rupture, after firing to cone
  indicated, p.s.i., at room temperature:
  Cone 08 _____ 399
  Cone 4 _____ 564

The L blocks of the present invention can be made by use of slip casting using the appropriate percentages of the ingredients specified above. It is preferred that the coating composition be such that it can be slipcast too and for such slip casting the calcined-kyanite-containing refractory composition uses a plastic clay, such as kaolin or ball clay, that can be deflocculated by an electrolyte, in lieu of fire clay.

L blocks for a drawing apparatus, and refractory blocks made by the stiff mud process as described above and using the refractory composition of the invention have been tested under conditions of thermal shock. They were found to be satisfactory, that is, free of cracking and spalling under the conditions used. The L blocks have been set in a drawing apparatus while both were at room temperature. The drawing apparatus was brought up to temperature and the hot cutoff block and draw bar were transferred from a firing kiln to the drawing kiln and placed in position. To insert the draw bar it was necessary to temporarily reposition one of the L-blocks and then return it to its proper position. In each case the drawing apparatus has been operated satisfactorily without the cracking and spalling heretofore obtained with the refractory L blocks of the composition of the prior art mentioned above. The cracking and spalling of the previous L blocks occurred to some extent even though these L blocks had been kept at an elevated temperature in the firing kiln until the drawing apparatus was brought up to temperature and then positioned in the latter.

In a research glass corrosion tank it had been customary to cover the dog-house filling hole with a brick. When the cover brick was an ordinary high-duty fire clay brick, it was necessary to replace it after a few hours of use. The cover block was subjected to a heavy thermal shock in this corrosion tank because fire clay brick was removed every half hour to add batch to the furnace. When the cover block was in place it was subjected to the furnace temperature on one side and to room temperature on the other. This use serves as a good test for resistance to cracking and spalling of a refractory article. A brick made with the refractory composition of the illustrative example by the stiff mud process was used as the cover block. It was used satisfactorily for 22 weeks. It was removed only because of its corrosion by the furnace fumes. This brick performed as well as a refractory brick made by the stiff mud process using a composition consisting of 85% fused silica and 15% plastic clay and illustrates that the use of the burnt clay in combination with the fused silica bonded by a plastic clay can produce a product having quite satisfactory resistance to cracking and spalling. The ratio of burnt clay to the fused silica in the compositions should not be too high and preferably should be less than 2. These compositions of the invention are more refractory than that made with a considerably higher fused silica content.

There is obtained a similar improvement in other refractory articles, such as cover tiles or plates for drawing kilns, when the compositions of the present invention are used to make the refractory articles.

It is apparent from the foregoing that the fired or calcined refractory articles made from the compositions of this invention will contain about 20 to 70% of fused silica and about 80 to 30% of burnt clay because the plastic clay used to bond the mixture of burnt clay and fused silica is converted to burnt clay during the firing of the dried article obtained from the stiff mud or slip cast method. Also, of course, the composition of the illustrative example will provide a refractory article after firing, i.e., calcining, that is one third each of calcined fire clay, calcined flint and fused silica.

Fused silica has been described as one of the ingredients in the illustrative example as well as in the description of the compositions presenting the various ranges of the ingredients of the invention. Fused silica has the composition $SiO_2$ in amorphous or noncrystalline condition. Other refractory materials that also have a substantially uniform coefficient of expansion up to a temperature of at least about 2400° F. with less than 0.4% expansion due to increase in temperature from room temperature to 2000° F. can be used in the range specified for fused silica and with the other ingredients the ranges are specified above. Examples of such materials are cordierite (a magnesia-alumina-silica, essentially $2MgO.2Al_2O_3.5SiO_2$) and lithia-alumina-silica

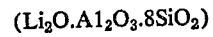

$$(Li_2O.Al_2O_3.8SiO_2)$$

The foregoing description is for the purpose of illustration only and the invention is limited only by the claims that follow.

I claim:

1. A composition for the preparation of a refractory L block for a sheet glass drawing apparatus which comprises a mixture of solids consisting essentially of about 15 to 45% by weight of a plastic clay, about 10 to 65% by weight of a burnt clay and about 20 to 70% by weight of a refractory material selected from the group consisting of fused silica, cordierite and lithia-alumina-silica, said refractory material being in the form of particles having a maximum size of about 9 mesh and a major portion of said refractory material being present as particles larger than 100 mesh.

2. A composition for the preparation of a refractory L block for a sheet glass drawing apparatus which comprises a mixture of solids consisting essentially of about 15 to 45% by weight of a plastic clay, about 10 to 65% by weight of a burnt clay and about 20 to 70% by weight of fused silica, said fused silica being in the form of particles having a maximum size of about 9 mesh and a major portion of said fused silica being present as particles larger than 100 mesh.

3. The composition of claim 2 wherein a major portion of the fused silica is particles larger than 48 mesh.

4. A composition for the preparation of a refractory L block for a sheet glass drawing apparatus which comprises a mixture of solids consisting essentially of about one third by weight of a plastic clay, about one third by weight of a burnt clay and about one third by weight of fused silica, said fused silica being in the form of particles having a maximum size of about 9 mesh and a major portion of said fused silica being present as particles larger than 100 mesh.

5. The composition of claim 4 wherein the plastic clay is fire clay and the burnt clay is calcined flint.

6. A composition for the preparation of a refractory L block for a sheet glass drawing apparatus which consists essentially of about 10 to 21% by weight of water and a mixture of solids consisting essentially of about 15 to 45% by weight of a plastic clay, about 10 to 65% by weight of a burnt clay and about 20 to 70% by weight of fused silica, said fused silica being in the form of particles having a maximum size of about 9 mesh and a major portion of said fused silica being present as particles larger than 100 mesh, said water content being based on the total weight of said plastic clay, burnt clay and fused silica.

7. A composition for the preparation of a refractory L block for a sheet glass drawing apparatus which comprises about 10 to 21% by weight of water and a mixture of solids consisting essentially of about one third by weight of a plastic clay, about one third by weight of a burnt clay and about one third by weight of fused silica, said fused silica being in the form of particles having a maximum size of about 9 mesh and a major portion of said fused silica being present as particles larger than 100 mesh, said water content being based on the total weight of said plastic clay, burnt clay and fused silica.

8. The composition of claim 7 wherein the plastic clay is fire clay and the burnt clay is calcined flint.

9. A process for the manufacture of an L block for a sheet glass drawing apparatus which comprises forming the composition of claim 6, shaping the composition to the approximate configuration of the refractory L block, drying the shaped product and firing the dried product at a maximum temperature of about 2150° F. to produce the refractory L block.

10. A process for the manufacture of an L block for a sheet glass drawing apparatus which comprises forming the composition of claim 7, shaping the composition to the approximate configuration of the refractory L block, drying the shaped product and firing the dried product at a maximum temperature of about 2150° F. to produce the refractory L block.

11. The process of claim 10 wherein the plastic clay is fire clay and the burnt clay is calcined flint.

12. A refractory L block for a sheet glass drawing apparatus, said L block having a composition comprising 20 to 70% by weight of particles of fused silica and the balance burnt clay, said particles having a maximum particle size of about 9 mesh and the major portion of said fused silica being present as particles larger than 100 mesh.

13. The refractory L block of claim 12 wherein the major portion of the fused silica is particles larger than 48 mesh.

14. The refractory L block of claim 12 wherein the fused silica constitutes about one third by weight of the composition.

References Cited in the file of this patent
UNITED STATES PATENTS

| | | |
|---|---|---|
| 1,424,120 | Rossman | July 25, 1922 |
| 1,858,317 | Willetts | May 17, 1932 |
| 1,882,701 | Alley | Oct. 18, 1932 |
| 2,339,454 | Bradley | Jan. 18, 1944 |

UNITED STATES PATENT OFFICE
CERTIFICATE OF CORRECTION

Patent No. 2,880,098                                                    March 31, 1959

Richard E. Jones

It is hereby certified that error appears in the printed specification of the above numbered patent requiring correction and that the said Letters Patent should read as corrected below.

Column 3, line 28, for "coatings 77" read -- coatings 11 --; lines 33, 34 and 35, for "33 1/3", each occurrence, read -- 33 1/3% --.

Signed and sealed this 29th day of September 1959.

(SEAL)
Attest:

KARL H. AXLINE                                                        ROBERT C. WATSON
Attesting Officer                                             Commissioner of Patents